United States Patent [19]

Stewart, Jr. et al.

[11] Patent Number: 4,557,748

[45] Date of Patent: Dec. 10, 1985

[54] METHOD OF LOWERING THE MAGNESIUM IMPURITY LEVEL OF WET-PROCESS PHOSPHORIC ACID DURING PRODUCTION OF LIQUID FERTILIZER

[75] Inventors: Norman L. Stewart, Jr., Lake Alfred, Fla.; Ken E. Kranz, Kansas City, Mo.

[73] Assignee: Farmland Industries, Inc., Kansas City, Mo.

[21] Appl. No.: 644,331

[22] Filed: Aug. 24, 1984

[51] Int. Cl.$^4$ .............. C05B 7/00; C05B 1/00; C01F 1/00; C01B 25/16

[52] U.S. Cl. .............................................. 71/32; 71/34; 71/41; 423/158; 423/321 R

[58] Field of Search ............... 423/319, 320, 321 R, 423/321 S, 167, 158; 71/32, 34, 41

[56] References Cited

U.S. PATENT DOCUMENTS

| | | | |
|---|---|---|---|
| 2,936,888 | 5/1960 | Williams | 423/321 R |
| 3,206,282 | 9/1965 | Crawford et al. | 23/165 |
| 3,379,501 | 4/1968 | Treitler et al. | 23/165 |
| 3,442,609 | 5/1969 | Crothers et al. | 23/169 |
| 3,481,700 | 12/1969 | Legal et al. | 423/321 R |
| 3,528,771 | 9/1970 | Shearon et al. | 423/320 |
| 3,642,439 | 2/1972 | Moore et al. | 23/165 |
| 3,819,810 | 6/1974 | Goldstein | 423/321 |
| 4,136,199 | 1/1979 | Mills | 423/321 R |
| 4,243,643 | 1/1981 | Mills | 423/319 |
| 4,248,843 | 2/1981 | Williams et al. | 423/321 R |
| 4,299,804 | 11/1981 | Parks et al. | 423/321 R |

FOREIGN PATENT DOCUMENTS

467843 6/1937 United Kingdom .
1024924 4/1966 United Kingdom .

Primary Examiner—Gregory A. Heller
Attorney, Agent, or Firm—Schmidt, Johnson, Hovey & Williams

[57] ABSTRACT

A process for treating wet-process weak phosphoric acid solution is disclosed which significantly lowers the magnesium impurities in the acid (as well as certain other impurities) permitting subsequent concentration of the acid to levels for use in preparation of liquid fertilizers which are less prone to settling out of the impurities during storage than would be the case without such treatment. It has unexpectedly been found that by limiting evaporation of water from the initial 26% to 32% $P_2O_5$ wet-process acid to a level such that the acid has a $P_2O_5$ content of from about 42% to about 45% and thereafter maintaining the semi-concentrated acid at a temperature within the range of from about 145° F. to about 270° F. for an aging period containing of from about 24 hours to about 144 hours magnesium impurity crystals are formed of a size, shape and density such that when the acid is subjected to conventional centrifugation, a significant proportion of the magnesium impurities are removed from the acid to substantially avoid heretofore encountered problems associated with precipitation of magnesium compounds during storage of liquid fertilizers prepared from the magnesium purged concentrated acid.

10 Claims, 3 Drawing Figures

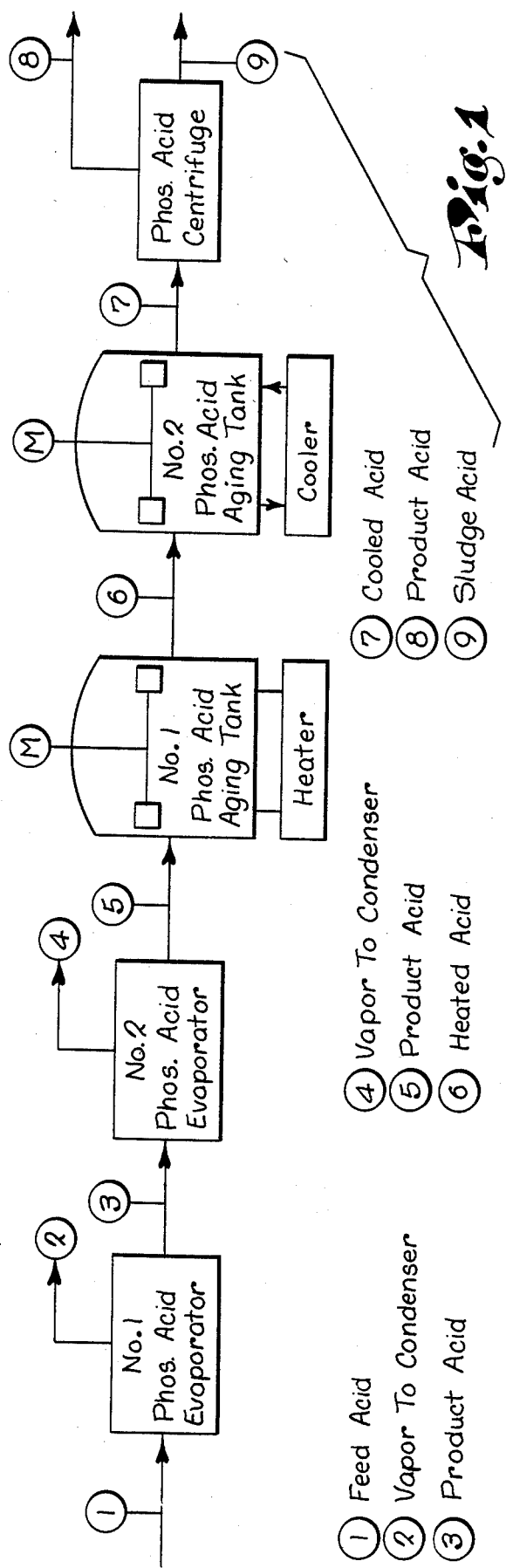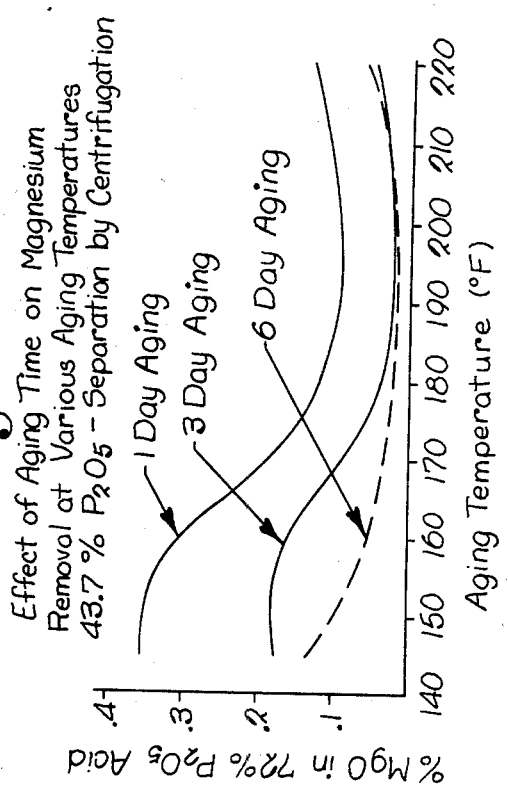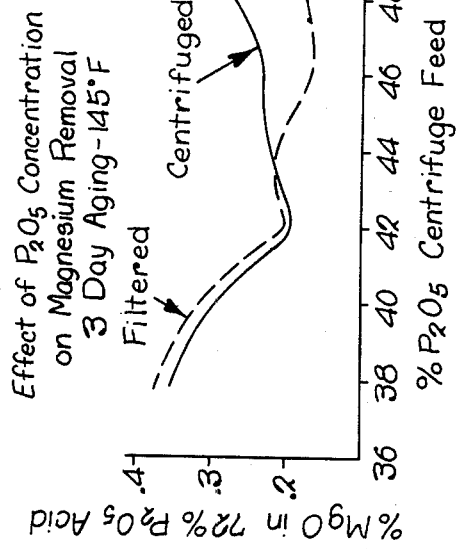

METHOD OF LOWERING THE MAGNESIUM IMPURITY LEVEL OF WET-PROCESS PHOSPHORIC ACID DURING PRODUCTION OF LIQUID FERTILIZER

BACKGROUND OF THE INVENTION

1. Field of Invention

This invention relates to the field of liquid fertilizers prepared from wet-process phosphoric acid and especially to an improved method of treating weak wet-process phosphoric acid to significantly lower the level of magnesium impurities therein which would otherwise carry through to the liquid fertilizer and form magnesium containing compounds therein which would settle out during extended storage of the liquid fertilizer.

For economic reasons, phosphoric acid used in the production of fertilizers, including liquids, has generally been obtained from phosphate rock which is acidulated with sulfuric acid to precipitate calcium sulfate, the solids removed by filtration, and the weak acid then concentrated to a desired level by any one of a number of conventional evaporative techniques. Much effort has gone into development of processes which lower or minimize the effect on fertilizers of impurities which are present in the acid following concentration, with only marginal success being realized in most instances because of the high cost of impurity removal or inadequacy of the treatment procedure.

Particularly vexatious has been the problem of removing magnesium compounds from wet-process phosphoric acid during concentration of the acid because of the solubility of these compounds in the acid notwithstanding the fact that after production of liquid fertilizers from concentrated acid, there is a significant tendency for impurities such as magnesium compounds to form gelatinous sludges or precipitates at the bottom of storage facilities for the liquid product. Many reasons have been identified for the tendency of magnesium impurities to precipitate from liquid fertilizers during storage.

Most liquid fertilizers are prepared from wet-process phosphoric acid having an effective $P_2O_5$ content of 68% or greater, and in order to obtain wet-process acid of this concentration, the weak acid must be subjected to evaporative processes which cause the resulting acid to have a relatively high final temperature. On cooling, the viscosity increases thereby making handling of the 68% acid more difficult. Also, the higher the level of impurities, the greater the viscosity of the acid. Compensation for these additive factors makes it desirable to ship the 68% acid in insulated tank cars which maintain the acid at a temperature level approaching that at which it was introduced into the tank car. In order to minimize problems of thickening of the acid during shipment, the acid during concentration should be subjected to processes which reduce the impurity content level. This makes the unloading and processing thereof much easier. The acid upon receipt should be in condition for ready transfer and reaction in a pipe reactor with ammonia to produce liquid fertilizer.

Liquid fertilizers during storage will form a gelatinous sludge if adequate steps have not previously been taken to remove deleterious impurities from the feed acid and, therefore, exhibit a limited shelf life. The length of the shelf life depends upon the ambient temperature encountered during storage and the impurities content that carried over from the wet-process acid. Of the impurities that may be present in the liquid fertilizer, magnesium is the most detrimental. Experience has shown that the acid used for making liquid fertilizers must have a MgO concentration of less than 0.4% (68% $P_2O_5$ basis) to yield a product with accceptable shelf life when as little as 60% of the total phosphate is present as polyphosphates.

Although settling out of solids in the storage tank is a problem which causes concern to suppliers and retail outlets, the real problem is encountered by the user of the products when an attempt is made to apply the liquid fertilizer to the land using conventional spray nozzles and applicator tools. Solids present in the liquid quickly clog up delivery apertures causing costly downtime of the equipment and exasperation on the part of the user.

Rather than attempt to remove sufficient magnesium impurities after liquid fertilizer production and storage, the preferred procedure is to remove the undesirable impurities from the wet-process phosphoric acid during production thereof, thus avoiding sludge and solids accumulation in liquid fertilizer products at the time of application to the ground.

2. Prior Art

Efforts to remove deleterious impurities from wet-process phosphoric acid have taken many forms in the prior art and often involved addition of various agents to the acidic solution which were designed to effect precipitation of impurities for removal by filtration. In British Pat. No. 467,843 of June 24, 1937, it is proposed that hydrofluoric acit be added to the wet-process phosphoric acid and that the ratio of calcium and aluminum present in the mixture be controlled within a critical relationship. Carothers, et al. in British Pat. No. 1,024,924 of Apr. 6, 1966 teach adjustment of the mole ratios of aluminum to silicon in the acid and of aluminum to fluorine followed by addition of a soluble calcium orthophosphate in an amount said to be sufficient to react with the impurities and form a complex crystalline solid.

Crawford, et al. in U.S. Pat. No. 3,206,282 of Sept. 14, 1965 describe a process for treating phosphoric acid to remove undesirable impurities by concentrating the acid to a level of 75% by weight phosphoric acid or greater followed by addition of after-precipitate solids obtained from a previous mixture to clear concentrated phosphoric acid and then cooling the mixture to a level of 30° to 120° F. during a period of 20 to 36 hours. Filtration of the liquid is then said to remove substantial quantities of impurities.

Treitler, et al. in U.S. Pat. No. 3,379,501 suggest that impurities may be removed from wet-process phosphoric acid by adjusting the calcium ion level of the acid and then adding hydrofluoric acid in amounts to react with all of the cation impurities therein.

Carothers, et al. U.S. Pat. No. 3,442,609 of May 6, 1969 which is a CIP of the application which corresponds to British Pat. No. 1,024,924 suggest adding a sodium salt to the wet-process phosphoric acid in order to enhance the removal of impurities.

Legal, et al. in U.S. Pat. No. 3,481,700 of Dec. 2, 1969 describe a process for stabilizing wet-process phosphoric acid wherein the acid is dehydrated to a level of about 38% to 46% by weight $P_2O_5$, cooled to a temperature of 20° C. to 50° C., agitated for a period from about 4 to 12 hours, allowed to stand for a period of 12 to 24 hours in a quiescent state and then subjected to filtration to remove solids.

Shearon, et al. in U.S. Pat. No. 3,528,771 of Sept. 15, 1970 provide a centrifuge operable to separate solids from sludge at a bottom of a settling tank installed between first and second stage evaporators. Settling is a primary means of removing solids from the main process stream. The sludge and entrained liquid from the settling tank goes to the centrifuge while the overflow therefrom is returned to the filtrate storage tank. Filtrate is fed to the first stage evaporator.

Moore, et al. in U.S. Pat. No. 3,642,439 of Feb. 15, 1972 suggest treatment of the phosphoric acid to limit the silicon content followed by maintaining the acid at a temperature of 50° C. to 100° C. for at least 15 hours to form a precipitate said to be a magnesium-aluminum-fluoride-phosphate complex compound which is then separated from the acid.

In U.S. Pat. No. 3,819,810 of June 25, 1974, Goldstein again suggests the addition of a compound containing fluorine to merchant grade acid having a $P_2O_5$ assay of 52% to 54% to enhance recovery of impurities.

The Mills U.S. Pat. Nos. 4,136,199 of Jan. 23, 1979 and 4,243,643 of Jan. 6, 1981 suggest removal of metal ion impurities from wet-process phosphoric acid by addition to the acid of a precipitant comprising ions of calcium and fluorine to cause precipitation of a magnesium-containing precipitate. A preferred precipitant is one containing calcium fluoride, such as the sludge obtained by treating pond water from a phosphoric acid plant with a calcium-containing compound.

Williams, et al. in U.S. Pat. No. 4,248,843 of Feb. 3, 1981 propose treating wet-process phosphoric acid to remove impurities by heating the acid under conditions of temperature, pressure, time and concentration as to cause at least some of the impurities to precipitate as pyrophosphates of the relevant metal ion.

Parks, et al. in U.S. Pat. No. 4,299,804 of Nov. 10, 1981 again teach the addition of hydrofluoric acid along with alum to wet-process phosphoric acid, certainly for the purpose of increasing the precipitation of impurities for removal by filtration.

SUMMARY OF THE INVENTION

The present invention provides a simple and relatively inexpensive method of significantly lowering the magnesium impurities in wet-process phosphoric acid to a level such that magnesium compounds in liquid fertilizers prepared from the acid in concentrated form will not normally settle out during extended storage of the fertilizer. The treatment may be carried out using existing evaporative and centrifuge equipment without significant costs in carrying out the overall process. Removal of a sufficient proportion of magnesium contained in the wet-process acid to avoid settling out of magnesium containing compounds during storage of liquid fertizliers manufactured from the concentrated acid is accomplished by limiting evaporation of water from the initial 26% to 32% $P_2O_5$ wet-process acid to a level such that the acid has a $P_2O_5$ content of from 42% to less than 45% and thereafter maintaining the semi-concentrated acid at a temperature within the range of from about 145° F. to about 220° F. for an aging period of from about 24 hours to about 144 hours while agitating the acid. Aging of the acid is carried out for a time period and under conditions resulting in the formation of magnesium impurity crystals of a size, shape and density that they unexpectedly may be separated from the acid by conventional centrifugation to an extent that the level of such impurity carried to the liquid fertilizers prepared from concentrated acids does not settle out from the fertilizer liquid during normal storage.

In the preferred process, the weak wet-process phosphoric acid is concentrated to a level of about 42% to 44% $P_2O_5$, directed to an aging tank and maintained therein at a temperature of the order of 185° F. for at least about 72 hours, cooled to a temperature of about 120° F. and then centrifuged under conditions such that the magnesium impurities are reduced to a concentration no greater than a value of about 0.4% MgO expressed on a 68% $P_2O_5$ basis before being directed to the evaporative system for increasing the concentration of the phosphoric acid to a level for use in the preparation of liquid fertilizers or other products. Desirably the centrifugation step reduces the Mg impurities to a level not exceeding about 0.2% expressed as MgO.

DRAWINGS

FIG. 1 is a schematic representation of a flow diagram illustrating a preferred processing sequence for carrying out the treatment process of the present invention with the content of the streams being indicated by numeral representations in the flow diagram and appropriate legend therefor;

FIG. 2 is a graphical illustration of the effect of $P_2O_5$ content of the wet-process phosphoric acid on the degree of magnesium impurities removal when the acid is aged for three days at 145° F.; and FIG. 3 is a graph of the effect of time and temperature of aging on magnesium impurity removal on wet-process phosphoric acid having a constant $P_2O_5$ content of 43.7%.

DETAILED DESCRIPTION OF THE INVENTION

The treatment process of the invention is an improvement in the conventional procedure for preparing 68%+$P_2O_5$ phosphoric acid for use in production of various final products including 10-34-0 liquid fertilizer compositions and similar nutrients. Phosphoric rock is acidulated with sulfuric acid and the resulting calcium sulfate removed from the liquid by filtration equipment. However, a portion of the impurities in the rock are dissolved and are present in the resulting wet-process phosphoric acid. Although compounds and complexes containing calcium, magnesium, aluminum, iron, silicon, fluorine and sulfate are present in the acid as impurities, it has been found that magnesium is in large measure responsible for problems encountered with settling out of magnesium containing compounds during storage of liquid fertilizers prepared from 68%+$P_2O_5$ wet-process phosphoric acid. The weak wet-process phosphoric acid typically has a $P_2O_5$ content of 26% to 32% after removal of gypsum and varying amounts of impurities.

During concentration of the wet-process acid following removal of gypsum, the elevated temperatures used in the evaporative steps results in evolution of fluorine compounds, principally silicon tetrafluoride and hydrofluoric acid but compounds of magnesium and aluminum are not removed by the evaporative procedures. As a consequence, storage of liquid fertilizers manufactured from such wet-process phosphoric acid has presented increasingly difficult problems attributable to settling out of magnesium compounds, and to a somewhat lesser extend aluminum compounds which are relatively insoluble at the storage temperatures that must be tolerated in many areas of the country.

Directing attention to the schematic flow diagram of FIG. 1, weak wet-process phosphoric acid feed is directed via line 1 to the number 1 phosphoric acid evaporator. As indicated, the feed acid has a nominal $P_2O_5$ content of 26% to 32%. The overhead from the number 1 evaporator is directed via line 2 to a suitable condenser while the liquid product acid is transferred to the number 2 phosphoric acid evaporator via line 3. Again the vapor overhead from the number 2 evaporator flows through line 4 to the water condensing apparatus while product acid from the number 2 evaporator is directed into the number 1 phosphoric acid aging tank through means illustrated schematically by the line 5. It is to be understood that the flow diagram of FIG. 1 is intended to be a schematic depiction of either a batch operation or a continuous process at the election of the operator and thus the necessary valving for batch processing or flow controllers for continuous treatment have been omitted for clarity.

Whether batch or continuous, a motor driven agitator is preferably provided within the number 1 phosphoric acid aging tank to keep the contents of the tank in constant movement and a heater is suitably joined to the number 1 tank in a manner to effect constant circulation of the product contained therein and maintain the temperature of such liquid at a predetermined value. The heated acid from the number 1 tank is directed into number 2 phosphoric aging tank through the medium of line 6 therebetween and here again a motor driven agitator is provided in the number 2 tank for constant agitation of the liquid product therein. A cooler associated with the tank number 2 functions to permit selective cooling of the product as recirculation thereof is carried out through the heat exchanger. The cooled acid from the number 2 aging tank flows either on a batch or continuous basis to the phosphoric acid centrifuge system via line 7 with the solids free product acid being directed to the subsequent evaporation stages of the process through line 8 while sludge acid is removed from the centrifuges through line 9.

As briefly alluded to in the Summary hereof, the improved treatment process illustrated schematically in FIG. 1 is carried out under conditions such that the phosphoric acid directed to the number 1 and number 2 evaporators is treated in a manner to cause the acidic product directed to the number 1 aging tank to have an effective $P_2O_5$ content of from about 42% to less than 45%. The semi-concentrated phosphoric acid is retained in the aging tank number 1 while being recirculated through the heater associated therewith for a time period of from about 24 hours to about 144 hours and with the temperature of the acid being maintained within a range of about 145° F. to about 220° F. In the number 2 aging tank, the temperature of the product is lowered to a level allowing removal of solids therefrom through the use of conventional metallurgy centrifuges. For this reason, the temperature of the acid is lowered in aging tank number 2 such that the product flowing through line 7 to the centrifugation stages is nominally about 120° F. The reason for lowering the temperature of the acid before introduction into the centrifuges is to prevent undesirable corrosion of the metal components of the centrifuges.

In order to remove the precipitated solids from the aged acid in an economical and efficient manner, the aging process is carried out as described in a manner permitting separation of solids from liquid by centrifugation. The required degree of separation may be accomplished using a rotatable bowl type centrifuge where at least the parts exposed to the acid are of a corrosion resistant metal, as for example 316 stainless steel. In addition, it has been determined that required separation of solids from the liquid may be obtained by use of a centrifuge having a diameter of about twenty-four inches with the bowl being rotated at approximately 4200 R.P.M. and the flow of acid through the centrifuge being regulated so that the weight ratio of product stream to sludge stream is maintained at a ratio of about 2:1. Under these operating conditions, an acid feed of about 42% $P_2O_5$ but less than 45% $P_2O_5$ can be purified equally as well but much more economically than by filtration. A centrifuged acid containing less than 0.4% magnesium expressed as MgO on a 68% $P_2O_5$ basis can be produced and demonstrated by operating plant data, recorded for example in Table I hereunder. Reference to FIG. 2 shows the importance of centrifuging aged acid containing less than 45% $P_2O_5$, preferably 43% to 44% $P_2O_5$, in that above these levels centrifuging becomes less effective. Observed deterioration in the size of the magnesium bearing crystals ages at $P_2O_5$ concentrations above the critical values of 42% to less than 45% and to a lesser extent increasing aged acid viscosity are probable causes for a decrease in the effectiveness of centrifugation.

Typical parameters for a process carried out in accordance with the schematic representation of FIG. 1 embodying preferred parameters of treatment are as follows and expressed in each instance on an as is basis:

TABLE I

| Stream No. | Stream Description | Flow Rate #/Min. | Flow Rate GPM (SCFM) | Absolute Pressure In. Hg. |
|---|---|---|---|---|
| 1 | Evaporator Feed Acid | 2500 | 222 | 29.9 |
| 2 | 1st Stage Evaporator Vapor to Condenser | 556 | 11,081 | 9.0 |
| 3 | 1st Stage Evaporator Product Acid | 1944 | 155 | 9.0 |
| 4 | 2nd Stage Evaporator Vapor to Condenser | 360 | 8,157 | 6.0 |
| 5 | 2nd Stage Evaporator Product Acid | 1584 | 117 | 6.0 |
| 6 | 1st Stage Aged and Hot Acid | 1584 | 117 | 29.9 |
| 7 | 2nd Stage Aged and Cooled Acid (Centrifuge Feed Acid) | 1584 | 117 | 29.9 |
| 8 | Centrifuge Product Acid | 1045 | 78 | 29.9 |
| 9 | Centrifuge Sludge Acid | 539 | 39 | 29.9 |

TABLE 1A

| Stream No. | Temp. °F. | Wt. % Solids | Wt. % $P_2O_5$ | Wt. % MgO[1] | Wt. % $Al_2O_3$ |
|---|---|---|---|---|---|
| 1 | 140 | 0.5 | 28.0 | 0.32 | 1.08 |
| 2 | 185 | — | — | — | — |
| 3 | 185 | 1.4 | 36.0 | 0.41 | 1.39 |
| 4 | 185 | — | — | — | — |

TABLE 1A-continued

| Stream No. | Temp. °F. | Wt. % Solids | Wt. % $P_2O_5$ | Wt. % MgO[1] | Wt. % $Al_2O_3$ |
|---|---|---|---|---|---|
| 5 | 185 | 2.3 | 44.22 | 0.50 | 1.71 |
| 6 | 180 | 4.8 | 44.22 | 0.50 | 1.71 |
| 7 | 120 | 4.8 | 44.22 | 0.50 | 1.71 |
| 8 | 120 | 0.30 | 45.75 | 0.23 | 1.24 |
| 9 | 120 | 13.80 | 41.30 | 1.04 | 2.65 |

[1]Ppt. is predominantly $MgAlF_6 \cdot xH_2O$ or $MgNaAlF_6 \cdot xH_2O$ (Ralstonite)

TABLE 1B

| Stream No. | Wt. % CaO | Wt. % $SO_4$ | Wt. % F | Sp. Gr. |
|---|---|---|---|---|
| 1 | 0.42 | 3.15 | 2.37 | 1.35 |
| 2 | — | — | 0.019 | — |
| 3 | 0.57 | 4.05 | 2.52 | 1.49 |
| 4 | — | — | 0.054 | — |
| 5 | 0.67 | 4.98 | 1.88 | 1.62 |
| 6 | 0.67 | 4.98 | 1.88 | 1.62 |
| 7 | 0.67 | 4.98 | 1.88 | 1.62 |
| 8 | 0.06 | 4.24 | 0.70 | 1.60 |
| 9 | 1.89 | 6.46 | 4.24 | 1.66 |

Plant tests to establish the optimum processing conditions have shown that when the weak wet-process phosphoric acid is evaporated to a level of 43% to 44% effective $P_2O_5$ and aged for 72 hours at a temperature of 190° F., essentially maximum removal of magnesium compounds is obtained using centrifuges for solids separation along with other impurities such as aluminum compounds and complexes.

The results of confirmatory tests are set out in the graph of FIG. 2 which graphically depicts the data of Table II while FIG. 3 is a graphical depiction of the data set out in Tables III and IV.

TABLE II

EFFECT OF $P_2O_5$ CONCENTRATION ON MAGNESIUM REMOVAL[2]
Analysis of Samples Aged Three Days
72% $P_2O_5$ Basis, 145° F. Aging Temperature

| | Wt. % $P_2O_5$ (as is basis) | Wt. % MgO | Wt. % $Al_2O_3$ | Wt. % $Na_2O$ | Wt. % F |
|---|---|---|---|---|---|
| Aging Tank Feed | 37.8 | 1.07 | 3.38 | 0.308 | 6.90 |
| Centrifuged Product | 40.3 | 0.50 | 2.57 | 0.183 | 4.36 |
| Filtered Product | 38.2 | 0.54 | 2.60 | 0.177 | |
| Aging Tank Feed | 39.8 | 1.04 | 3.26 | 0.255 | 4.02 |
| Centrifuged Product | 42.6 | 0.40 | 2.35 | 0.108 | 3.60 |
| Filtered Product | 41.3 | 0.44 | 2.44 | 0.112 | |
| Aging Tank Feed | 42.1 | 1.09 | 3.34 | 0.303 | 3.97 |
| Centrifuged Product | 45.5 | 0.18 | 2.03 | 0.088 | 1.79 |
| Filtered Product | 44.4 | 0.20 | 2.07 | 0.093 | |
| Aging Tank Feed | 44.2 | 0.99 | 3.35 | 0.288 | 4.51 |
| Centrifuged Product | 47.5 | 0.24 | 2.03 | 0.068 | 2.17 |
| Filtered Product | 46.8 | 0.22 | 2.04 | 0.082 | |
| Aging Tank Feed | 46.2 | 1.01 | 3.28 | 0.290 | 4.04 |
| Centrifuged Product | 49.1 | 0.26 | 2.10 | 0.077 | 1.34 |
| Filtered Product | 49.1 | 0.13 | 1.94 | 0.078 | |
| Aging Tank Feed | 48.7 | 0.99 | 3.26 | 0.245 | 3.50 |
| Centrifuged Product | 50.7 | 0.39 | 2.35 | 0.091 | 1.38 |
| Filtered Product | 51.2 | 0.17 | 1.99 | 0.091 | |

TABLE II-continued
EFFECT OF $P_2O_5$ CONCENTRATION ON MAGNESIUM REMOVAL[2]
Analysis of Samples Aged Three Days
72% $P_2O_5$ Basis, 145° F. Aging Temperature

| | Wt. % $P_2O_5$ (as is basis) | Wt. % MgO | Wt. % $Al_2O_3$ | Wt. % $Na_2O$ | Wt. % F |
|---|---|---|---|---|---|
| Product | | | | | |

[2]Centrifuged 4000 R.P.M. at 120° F.
Filtered through a 1 micron filter membrane

TABLE III

EFFECT OF AGING TEMPERATURE ON IMPURITY REMOVAL EMPLOYING CENTRIFUGATION[3]
Samples Aged Three Days, 72% $P_2O_5$ Basis

| Sample Description | Aging Temp. | $P_2O_5$ (as is basis) | Wt. % MgO | Wt. % $Al_2O_3$ | Wt. % $Na_2O$ | Wt. % F. |
|---|---|---|---|---|---|---|
| Aging Tank Feed | | 42.3 | 1.23 | 3.20 | 0.51 | 4.3 |
| Centrifuged Product | 110° F. | 45.9 | 0.87 | 3.00 | 0.07 | 3.10 |
| Aging Tank Feed | | 43.7 | 1.06 | 3.44 | 0.206 | 4.60 |
| Centrifuged Product | 145° F. | 46.7 | 0.17 | 1.91 | 0.070 | 1.60 |
| Centrifuged Product | 160° F. | 46.3 | 0.19 | 1.98 | 0.070 | 1.99 |
| Centrifuged Product | 175° F. | 48.0 | 0.05 | 1.75 | 0.110 | 1.10 |
| Centrifuged Product | 190° F. | 48.1 | 0.02 | 1.65 | 0.133 | 1.17 |
| Centrifuged Product | 205° F. | 48.9 | 0.035 | 1.66 | 0.112 | 1.14 |
| Centrifuged Product | 220° F. | 50.2 | 0.055 | 1.75 | 0.139 | 1.10 |

[3]Centrifuged 4000 R.P.M. at 120° F.

TABLE IV

EFFECT OF AGING TIME ON MAGNESIUM REMOVAL AT VARIOUS TEMPERATURES[4]

| Sample Description | Aging Temp. | Aging Time | Wt. % $P_2O_5$ (as is Basis) | Wt. % MgO (72% $P_2O_5$ Basis) |
|---|---|---|---|---|
| Aging Tank Feed | | | 43.7 | 1.06 |
| Centrifuged Product | 145° F. | 1 day | | 0.35 |
| | | 3 days | | 0.17 |
| | | 6 days | | 0.13 |
| Centrifuged Product | 160° F. | 1 day | | 0.32 |
| | | 3 days | | 0.19 |
| | | 6 days | | 0.06 |
| Centrifuged Product | 175° F. | 1 day | | 0.13 |
| | | 3 days | | 0.05 |
| | | 6 days | | 0.03 |
| Centrifuged Product | 190° F. | 1 day | | 0.11 |
| | | 3 days | | 0.02 |
| | | 6 days | | 0.02 |
| Centrifuged Product | 205° F. | 1 day | | 0.08 |
| | | 3 days | | 0.04 |
| | | 6 days | | 0.02 |
| Centrifuged Product | 220° F. | 1 day | | 0.13 |
| | | 3 days | | 0.06 |
| | | 6 days | | 0.07 |

[4]Centrifuged at 4000 R.P.M. at 120° F.

GENERALIZED DESCRIPTION OF THE INVENTION

At the present time, it is not fully understood why treatment of wet-process phosphoric acid at a critical $P_2O_5$ content (from about 42% to less than 45% and preferably 43% to 44%) by aging the semi-concentrated acid for 1 to 6 days (preferably 3 days) at a temperature of from 145° F. to 220° F. (preferably about 185° F. to 190° F.), results in the formation of magnesium crystal shapes, sizes and densities which are unexpectedly separable from the liquid acid by conventional centrifugation processes to reduce the magnesium impurities to a level such that the concentration thereof expressed as MgO is no greater than about 0.4% on a 68% $P_2O_5$ basis. It is believed that the improved results realized are attributable at least in part to a combination of factors including acid viscosity, optimum solubility of the magnesium compounds at the semi-concentrated acid $P_2O_5$ level found to be essential, and enhancement of the formation of crystals of just the right size, shape and density for efficient centrifugal separation.

Insofar as magnesium crystal size, shape and density is concerned, microscopic studies of the acid before aging, during aging, immediately following aging and after centrifugation establish that although some of the larger crystals initially observed may no longer be present in the solution after substantial aging, the smaller and medium size crystals present have grown in size, are much more uniform in size and shape and therefore appear to be in a form far more amenable to removal by centrifugal action.

For example, the following was found to generally occur in precipitation of crystals during aging.

EXAMPLE 1

Effect of $P_2O_5$ Concentration on Crystal Size and Shape

The acid in this first investigation was aged at 145° F. All concentrations after one day of aging having three types of crystals—small 1-2 micron crystals, intermediate-sized irregular crystals approximately 4-7 microns in diameter, and elongated crystals approximately 10-12 microns in length. The small 1-2 micron crystals are present in 42%-49% $P_2O_5$ acid throughout six days of aging. The irregularly shaped intermediate-sized crystals appear to be modified hexagonal crystals. These crystals may have six sides of different lengths or appear as rectangular or diamond-shaped crystals when two opposing sides fail to grow. In 42%, $P_2O_5$ acid these intermediate-sized crystals disappear gradually, and the elongated crystals may double in size as the acid is aged. All three types of crystals remain in 44%-45% $P_2O_5$ acid throughout six days of aging. Both the intermediate-sized and elongated crystals grow slightly during aging. In 49% $P_2O_5$ acid the elongated crystals that are present after one day of aging are not present after three days of aging. A 2-4 micron irregularly shaped crystal is then the predominant crystal. As such, these crystals are not easily removed from the 49% $P_2O_5$ acid with a centrifuge operable under the conditions previously detailed. For example, rotation of the centrifuge at speeds beyond those customary to the wet-process phosphoric acid production industry is required.

EXAMPLE 2

Effect of Aging Temperature on Crystal Size and Shape

Acids at 42% and 45% $P_2O_5$ concentration aged at 145° F., 170° F., and 195° F. for up to six days were used in this experiment. The size and shape of crystals in 42% and 45% $P_2O_5$ acid aged at 145° F. are described in the preceding paragraph. At 170° F. the 42% $P_2O_5$ acid contains no elongated crystals at any time. This acid contains small 1-2 micron crystals and a few hexagonal crystals that may grow up to almost 40 microns in size after six days of aging. In 45% $P_2O_5$ acid after aging for one and three days at 170° F., small 1-2 microns, larger 10-20 microns modified hexagonal, and very few elongated crystals are present. After six days of aging, the modified hexagonal crystals decrease to less than 10 microns in size. When 42% and 45% $P_2O_5$ acid are aged at 195° F. for up to six days, no elongated crystals are seen at any time. Most crystals appear to be irregularly shaped hexagonal of various sizes. The largest crystals are found in the 42% $P_2O_5$ acid. These crystals grow from a maximum of 14 microns after one day of aging at 195° F. up to 30 microns at six days. All crystals in the 45% $P_2O_5$ acid are less than 10 microns during all six days of aging at 195° F.

It is also preferred that the aged acid be centrifuged at the highest temperature feasible depending upon the metallurgy of the centrifuges. This assures that the acid have the lowest possible viscosity for the particular processing conditions to allow the liquid to more readily be displaced from the solids of the acid undergoing separation.

Metallurgical parameters for existing centrifuges used in wet-process phosphoric acid processes suggests limitation of the temperature of the acid introduced to the centrifuges to a level no more than about 130° F. In order to provide a safety factor in this respect, the acid inlet temperature to the centrifuges preferably should not exceed about 120° F. Although the centrifuges can be operated at a lower acid temperature, as for example 110° F., it has been found that this is not essential for protection of the metal of the centrifuges and decreasing the temperature of the acid in this respect increases the viscosity of the acid and thus somewhat inhibits the separation of solids from the liquid.

We claim:

1. A process for preparing a wet process phosphoric acid based liquid fertilizer having a reduced tendency to form precipitates, said method comprising the steps of:

providing a quantity of weak wet process phosphoric acid having a magnesium impurity level of greater than about 0.4% MgO on a 68% $P_2O_5$ basis and which would cause liquid fertilizer prepared therefrom to have an undesirable level of precipitates;

initially evaporating said quantity of acid to form semi-concentrated acid having a $P_2O_5$ content of from about 42% to less than 45%;

aging said semi-concentrated acid for a period of from at least about 24 hours to about 144 hours under conditions for altering magnesium crystals within the semi-concentrated acid in order to facilitiate centrifugal separation thereof, said aging conditions including maintaining the semi-concentrated acid at a temperature within the range of from about 145° F. to about 220° F. throughout the aging period by means of supplemental heating of the semi-concentrated acid;

centrifuging the aged acid to remove altered magnesium crystals therefrom, said aging and centrifuging steps being carried out such that the centrifuged acid has a magnesium impurities level of no more than about 0.4% MgO on a 68% $P_2O_5$ basis;

further evaporating said centrifuged acid to a desired $P_2O_5$ concentration necessary for production of liquid fertilizer; and preparing a liquid fertilizer product from said centrifuged acid.

2. In a process as set forth in claim 1, wherein is included the step of lowering the magnesium impurities to a level of no more than about 0.2% MgO on a 68% $P_2O_5$ basis.

3. In a process as set forth in claim 2, wherein is included the step of lowering the temperature of the aged acid to a level avoiding deleterious corrosion of the centrifugation equipment before subjecting the acid to said centrifugation step.

4. In a process as set forth in claim 1, wherein is included the step of lowering the temperature of the aged semi-concentrated acid to a temperature of from about 130° F. to about 120° F. before centrifuging the acid to remove solids therefrom.

5. In a process as set forth in claim 2, wherein is included the step of lowering the temperature of the aged acid prior to said centrifugation step to a level no greater than about 120° F.

6. In a process as set forth in claim 1, wherein is included the step of agitating the semi-concentrated acid during aging.

7. In a process as set forth in claim 1, wherein is included the step of bringing the temperature of the semi-concentrated acid to a level within said temperature range of at least about 180° F. and maintaining the acid at least 180° F. level for substantially the full period of said aging.

8. In a process as set forth in claim 1, wherein is included the step of aging the acid for a time within said period of at least about 72 hours.

9. In a process as set forth in claim 1, wherein the semi-concentrated acid is subjected to the step of aging in two separate zones with the acid in the first zone being recirculated and subjected to heating during such recirculation to maintain the temperature thereof at a selected value within said temperature range.

10. In a process as set forth in claim 1, wherein is included the step of maintaining the semi-concentrated acid at a temperature of about 185° F. to about 190° F. during said aging period.

* * * * *